2,169,929

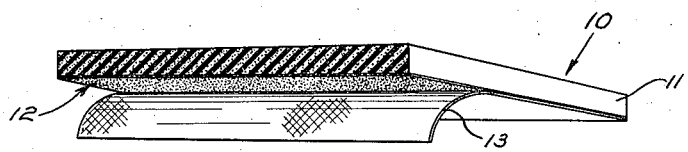
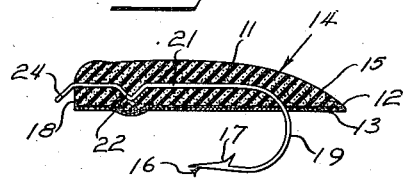
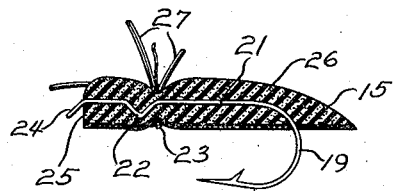
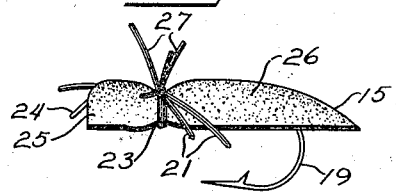
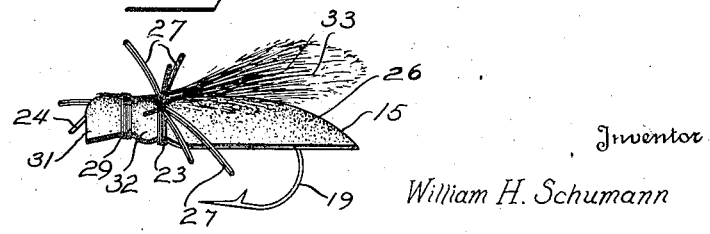
Inventor
William H. Schumann
By Strauch & Hoffman
Attorneys Patented Aug. 15, 1939

UNITED STATES PATENT OFFICE 2,169,929

FISHING LURE

William H. Schumann, Kent, Ohio, assignor to Fly Fish Kit Company, Kent, Ohio, a corporation of Ohio Application January 9, 1939, Serial No. 250,015

11 Claims. (Cl. 43—48)

The present invention relates to fishing lures manufactured of soft stretchable material such as sponge rubber and more specifically to a composite body structure designed to prevent stretching and undesired distortion of the body while retaining the softness of the body material.

This application is a continuation-in-part of my copending application Serial No. 82,946, filed June 1, 1936, wherein other and broader aspects of the invention are claimed. The invention claimed in the instant application is an improvement over that disclosed and claimed in my above-mentioned application.

Sponge rubber lures are now in common use and have proved extremely satisfactory as dry or submerged lures. It has been found, however, that repeated catches on a single lure result in harmful distortion of the soft sponge rubber body by reason of the stretching and consequent bodily sliding of the body along the shank of the hook. These forces have been the cause of greatly shortening the useful life of such lures. In the past, this objection was overcome by the use of tying strands at each end of the lure in addition to the tying strands between the ends. Such additional tying strands have, however, caused an undesired slowing up of manufacture and materially increased manufacturing costs.

It is, therefore, the primary object of this invention to construct, at reasonable cost, a soft sponge rubber lure having a useful life of unlimited duration.

A further important object of the present invention resides in providing the sponge rubber body of a fishing lure with a layer of non-stretchable fabric which prevents damaging distortion of the body and resists the stresses tending to stretch and slide the body along the hook.

Another object of the present invention resides in providing a lure having a soft, reinforced, sponge rubber body with tying strands which impart the desired life-like form to the body and cooperate with the reinforcement and a portion of the hook to secure the body to the hook in such a manner that the forces tending to stretch the body and slide it along the hook when a fish takes the hook are confined to the reinforcement and the tying strands.

Other objects will appear from the description and appended claims when read in conjunction with the attached drawing, wherein:

Figure 1 is a perspective view of a portion of a sheet of composite material from which the body of the lure of the present invention is formed.

Figure 2 is a longitudinal sectional view through a lure of the present invention illustrating the first step in the assembly of the body and hook.

Figure 3 is a sectional view through the lure of Figure 2 showing the second assembly step.

Figure 4 is an elevational view of the lure as shown in Figure 3.

Figure 5 is an elevational view of the completed lure made in accordance with the present invention.

With continued reference to the drawing, wherein like reference numerals are used throughout the several figures to designate the same parts, numeral 10 designates a composite material used to manufacture a lure having the characteristics of the present invention.

Material 10 is manufactured by coating one face of a relatively thick, sponge rubber sheet 11 with a suitable adhesive or cement 12. A cement which has been found to be particularly satisfactory is manufactured by the Goodyear Tire and Rubber Company and is obtainable on the open market under the designation "Neoprene D 700 F 3".

A relatively thin sheet 13 of a non-stretchable, readily deformable, fabric is then applied to the coated face of sheet 11 in any suitable manner. A fabric which has been found to have suitable characteristics and which it is preferred to use, is sold on the open market under the name "oiled silk". This fabric can be obtained in many different mesh sizes, namely, from 80 to 200 mesh to the square inch, all sizes of which have proved to be satisfactory. Such a fabric is water-proofed by applying an oil preparation which seals the meshes.

The particular cement used, namely, "Neoprene D 700 F 3" is particularly suited for use in the present invention since it is readily bent, compressed or twisted without cracking or allowing separation of the sponge rubber and fabric at any point. Due to the nature of this cement, each and every fibre of the fabric is intimately and permanently bonded to the surface of sheet 11.

Material 10 formed in relatively large sheets is cut in any suitable manner into body segments 14 of a size sufficient to produce the body of a lure. During this cutting operation, one end of segment 14 is rounded as at 15 to provide a simulation of the curved back of a live insect or bug.

Segment 14 is then threaded on a hook 16 by inserting barb 17 of the hook into end 18 of segment 14 and working the hook toward the opposite end. Before barb 17 reaches the opposite end of segment 14, it is worked downwardly through sponge rubber portion 10 of segment 14 then through the cement layer 12 and finally through fabric reinforcing layer 13 so that the major portion of the bight 19 and barb 17 are disposed under the body 14 (Figure 2).

The prevention of undesired stretching, sliding and distortion of body 14 is accomplished by providing shank 21 with an offset portion in the form of a V-shaped hump 22 and applying a tying strand 23 around body 14 adjacent hump 22 and between hump 22 and bight 19. Tying strand 23 may be of any suitable material such as silk or cat-gut that is not readily harmed by being soaked with water and is drawn tightly around body 14 so as to compress the soft body 14 sufficiently to assure the disposition of a portion of fabric 13 in a plane within the outermost extremity of hump 22.

Strand 23 furthermore serves to divide body 14 into a portion 25 and a body portion 26 thereby more accurately simulating the appearance of a live fly. Strand 23 preferably serves the further purpose of securing a plurality of thin, flexible rubber bands 27 simulating the legs, feelers and antennae of a live lure (Figures 3 and 4) to body 14 to impart a more life-like appearance to the lure. Strand 23 and fabric 13, due to their cooperation with the hump 22 prevent stretching of body 14 upon the application of axial forces applied to end 18 and also prevent bodily sliding of body 14 along shank 21 toward eye 24.

In order to effectively resist rearward stretching and sliding of body 14, a further tying strand 29 encircling body 14 adjacent hump 22 and between hump 22 and eye 24 is provided. Tying strand 29 compresses body 14 in the same manner as tying strand 23. Furthermore, tying strand 29 divides portion 25 of segment 14 into a head portion 31 and a thorax portion 32, thereby still further approaching the natural appearance of a live lure. Preferably strand 29 also serves to secure a plurality of natural hairs 33 to the upper surface of the lure. These hairs simulate the folded wings of a live lure and still further enhance the natural appearance of the lure.

Due to the use of a tying strand 29 disposed as described above, the grasping of the lure by a fish and the consequent rearward pull, resulting from playing the fish or pulling him in, will be resisted by fabric layer 13, tying strand 29 and hump 22 each of which cooperates with the other to resist the axial forces applied to body 14. As a consequence, stretching and distortion of body 14 as well as rearward bodily movement of the body along shank 21 is prevented.

From the above description, it clearly appears that the present invention provides a soft sponge rubber lure that will not stretch or slide along the hook in use and which, consequently, will have a much longer useful life.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. An artificial lure for use in fishing comprising a hook; a body of soft, deformable material, including a non-stretchable fabric layer permanently bonded thereto over a substantial surface area, mounted upon the shank of said hook; said hook having a portion of its shank surrounded by said material and having an end portion extending from said shank through said fabric layer to terminate externally of said body; and means to secure said body to said hook, said fabric layer resisting axial strains imparted to said body as a fish takes the lure or fights the lure after being hooked whereby stretching and harmful distortion of the body is obviated.

2. The combination defined in claim 1 wherein said body comprises a relatively thick, readily stretchable, sponge rubber layer and a thin, non-stretchable, waterproof fabric layer cemented to a face of said rubber layer.

3. An artificial lure for use in fishing, comprising a hook having an eye at one end and an offset portion on its shank; a body of soft, deformable material, including a non-stretchable fabric layer, mounted upon the shank of said hook with the offset portion of the hook embedded in the body; said hook having an end portion extending from said shank through said fabric layer so that a substantial portion thereof is outside said body; and means encircling said body adjacent the offset portion of said hook and compressing said body, including the fabric layer, toward said shank to secure said body to said hook, said means and said fabric layer cooperating with said offset portion to resist axial forces tending to stretch or slide said body along said hook and said means deforming said body in such a manner as to impart a life-like appearance to said lure.

4. The combination defined in claim 3, wherein said body comprises a relatively thick, readily stretchable sponge rubber layer and a thin non-stretchable fabric layer cemented to a face of said rubber layer.

5. An artificial lure for use in fishing, comprising a hook including an offset portion adjacent the end opposite the bight; a body of soft deformable material including a layer of non-stretchable, waterproof fabric mounted upon the shank of said hook with the bight of the hook extending through the fabric layer and curved under the body; means tightly encircling said body adjacent the offset portion and between said end and the offset portion, said means and the portion of the hook lying in the aperture in said fabric layer cooperating with the fabric layer to resist axial forces applied to the body whereby stretching or sliding of the body along the shank is prevented.

6. An artificial lure for use in fishing, comprising a hook including a shank having an eye at one end, a bight at the other end and an offset portion at a point between the eye and bight; a body, comprising a readily stretchable, sponge rubber portion of substantial thickness and a thin, non-stretchable oiled silk fabric layer secured to a face of said rubber portion, mounted on said shank with said shank and offset portion embedded in the sponge rubber portion and the bight protruding through the sponge rubber portion and said fabric layer at a point adjacent said other end of the body whereby forces applied to the end of said body at an angle to the axis of the shank will be concentrated at the point of contact of the fabric with the hook; and tying strands encircling said body on opposite sides of said offset portion of said hook and compressing said body toward said hook sufficiently to assure the disposal of said strands at a level below that of the offset portion whereby said strands cooperate with said offset portion through the compressed portions of said body to prevent lengthwise stretching and bodily movement of said body along said shank whereby deteriorative forces tending to stretch the soft deformable body are resisted and the useful life of the lure is greatly increased.

7. An artificial lure for use in fishing comprising a body of soft deformable material having a sheet of readily deformable but relatively non-stretchable material permanently bonded upon a surface thereof; a hook having its shank embedded in said body with its bight portion extending through said sheet so that the barbed point of the hook is disposed exteriorly of said body; and means secured upon said body and cooperating with a portion of said hook for preventing undesired displacement of said body along said hook.

8. An artificial lure comprising a body of sponge rubber or the like having a surface formed to simulate a desired live bait and a relatively flat surface upon which a sheet of non-stretchable, waterproof fabric is bonded in full surface engagement; a hook having its shank extending longitudinally through said body and with its bight portion extending through said sheet so that a substantial portion thereof is outside said body; and means secured upon said body and cooperating with a bent portion of said hook shank for securing said hook against undesired relative sliding movement with respect to said body, said last named means also serving to deform a portion of said body to further impart a life-like appearance to said lure.

9. An artificial lure for use in fishing comprising a body of stretchable deformable material; means providing a relatively non-stretchable layer extending over a considerable surface area of said body; a hook having a shank passing through said material and a portion emerging from said body through said layer for rendering said body relatively non-stretchable along said hook; means encircling said body and substantially compressing said material toward said shank and constituting the sole means to produce at least one section of reduced cross-section that visibly separates uncompressed portions of said body and thus brings the shape of said body into approximate simulation of the body of a live fly, bug, or the like; and elongated highly-flexible threads secured to said body and projecting laterally thereof and forming legs simulating the legs or antennae of a live fly, bug or the like and designed so as to quiver when the lure is used in fishing.

10. An artificial lure for use in fishing comprising a body of deformable material; a sheet of relatively non-stretchable material bonded upon a substantial surface area of said body; a hook having a shank passing through said material and an end portion emerging from said body through said sheet so as to prevent said body from being stretched along said hook in such a manner as to substantially cover the barb of the hook when a fish strikes and tugs at said body; means encircling said body and substantially compressing said material toward said shank and constituting the sole means to produce at least one section of reduced cross-section that visibly separates uncompressed portions of said body and brings the shape of said body into approximate simulation of the body of a live fly, bug, or the like; and elongated highly-flexible threads secured to said body and projecting laterally thereof and forming legs simulating the legs or antennae of a live fly, bug or the like and designed so as to quiver when the lure is used in fishing.

11. An artificial lure for use in fishing comprising a body of deformable material, a sheet of bendable but relatively non-stretchable material bonded upon a surface area of said body; a hook having a shank embedded in said material and a portion emerging from said body through said sheet in such a manner as to prevent said body from being unduly stretched along said hook, means encircling said body and substantially compressing said material toward said shank to bind said material to said shank and comprising the sole means to produce at least one section of reduced cross-section that visibly separates uncompressed portions of said body and thus brings the shape of said body into approximate simulation of the body of a live fly, bug or the like, and means to prevent shifting of said body along said shank toward the bight of said hook.

WILLIAM H. SCHUMANN.